US009139178B2

United States Patent
Grebe et al.

(10) Patent No.: US 9,139,178 B2
(45) Date of Patent: Sep. 22, 2015

(54) PRESSURE CONTROL VALVE ARRANGEMENT HAVING COVERS THAT ARE PRODUCED AS A COMPLETELY INTEGRAL PART WITH TRANSVERSE CHANNELS BY PRIMARY SHAPING

(75) Inventors: Jan Grebe, Starnberg (DE); Dirk Brenner, Stuttgart (DE); Jochen Weippert, Munich (DE); Wolfgang Rohn, Munich (DE); Harald Jaehns, Munich (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 447 days.

(21) Appl. No.: 13/381,042

(22) PCT Filed: Jun. 24, 2010

(86) PCT No.: PCT/EP2010/058990
§ 371 (c)(1),
(2), (4) Date: Mar. 23, 2012

(87) PCT Pub. No.: WO2011/000769
PCT Pub. Date: Jan. 6, 2011

(65) Prior Publication Data
US 2012/0175944 A1 Jul. 12, 2012

(30) Foreign Application Priority Data
Jun. 29, 2009 (DE) .......................... 10 2009 030 899

(51) Int. Cl.
*B60T 8/36* (2006.01)
(52) U.S. Cl.
CPC .......... *B60T 8/3605* (2013.01); *Y10T 29/49426* (2015.01)
(58) Field of Classification Search
CPC ............................ B60R 8/3605; B60R 8/3675
USPC ............................................ 303/119.1–119.2
See application file for complete search history.

(56) References Cited

U.S. PATENT DOCUMENTS

| 3,976,335 A | 8/1976 | Sekiguchi |
| 5,443,306 A * | 8/1995 | Broome ........................... 303/3 |
| 5,722,740 A * | 3/1998 | Engelbert et al. .......... 303/118.1 |

FOREIGN PATENT DOCUMENTS

DE    33 30 686    8/1983
(Continued)

OTHER PUBLICATIONS
International Search Report of PCT/EP2010/058990, dated Sep. 1, 2010.
(Continued)

*Primary Examiner* — Anna Momper
(74) *Attorney, Agent, or Firm* — Kenyon & Kenyon LLP

(57) ABSTRACT

A pressure control valve arrangement is described for controlling the fluid pressure in an ABS brake system of a vehicle in such a way that, while there is a tendency of individual wheels of the vehicle to lock, the brake pressure in at least one associated brake cylinder can be adaptively adjusted, wherein at least one diaphragm valve is accommodated in a housing of the pressure control valve arrangement, said diaphragm valve having a diaphragm as the valve body, which diaphragm can be acted upon by introducing a pressure medium into a control chamber that is covered on the outside of the housing by a respective cover produced by primary shaping, such as injection molding, in such a way that the control chamber is formed between the diaphragm and the cover, and wherein blind holes, which extend in the cover substantially perpendicularly to the plane of the cover, are formed in the cover, the blind hole opening of at least one of said blind holes leading into the control chamber, and the blind hole opening of at least one other of said blind holes leading into a pressure medium channel formed in the housing, and at least one and the other of said blind holes being fluidically interconnected by at least one transverse channel, characterized in that the transverse channel has an acute angle relative to the plane of the cover and opens at one end, by a transverse channel opening, into the control chamber or into the pressure medium channel, wherein the transverse channel opening at least partially overlaps the blind hole opening of one of the blind holes connected by the transverse channel.

14 Claims, 4 Drawing Sheets

(56) References Cited

FOREIGN PATENT DOCUMENTS

| DE | 86 19 384 | 8/1986 |
| EP | 0 266 555 | 5/1988 |
| GB | 2 25 912 | 8/1982 |
| JP | 7 223 524 | 8/1995 |
| WO | 2005/047072 | 5/2005 |

OTHER PUBLICATIONS

European Patent Office, International Preliminary Report on Patentability, Jan. 12, 2012, from International Patent Application No. PCT/EP2010/058990, filed on Jun. 24, 2012.

European Patent Office, English Translation of International Preliminary Report on Patentability and Written Opinion, Jan. 26, 2012, from International Patent Application No. PCT/EP2010/058990, filed on Jun. 24, 2010.

* cited by examiner

PRESSURE CONTROL VALVE ARRANGEMENT HAVING COVERS THAT ARE PRODUCED AS A COMPLETELY INTEGRAL PART WITH TRANSVERSE CHANNELS BY PRIMARY SHAPING

FIELD OF THE INVENTION

The present invention relates to a pressure control valve arrangement pressure control valve arrangement for controlling the fluid pressure in an ABS brake system of a vehicle in such a way that, while there is a tendency of individual wheels of the vehicle to lock, the brake pressure in at least one associated brake cylinder can be adaptively adjusted, wherein at least one diaphragm valve is accommodated in a housing of the pressure control valve arrangement, said diaphragm valve having a diaphragm as the valve body, which diaphragm can be acted upon by introducing a pressure medium into a control chamber that is covered on the outside of the housing by a respective cover produced by primary shaping, such as injection molding, in such a way that the the is formed between the diaphragm and the cover, and wherein blind holes, which extend in the cover substantially perpendicularly to the plane of the cover, are formed in the cover, the blind hole opening of at least one of said blind holes leading into the control chamber, and the blind hole opening of at least one other of said blind holes leading into a pressure medium channel formed in the housing, and the at least one and the other of said blind holes being fluidically interconnected by at least one transverse channel, in accordance with the description herein, and to a method for producing the same in accordance with the description herein.

BACKGROUND INFORMATION

ABS (antilock brake system) prevents wheels from locking and comes into operation when a higher friction coefficient between a tire and the road is demanded than can be transmitted, i.e. when the driver brakes too hard. In the case of excessively hard braking, the central electronic control unit of the ABS brake system detects the tendency for one or more wheels to lock from rotational speed detector signals and, from these signals, calculates the activation of the pressure control valve arrangement acting on the associated brake cylinder. The brake pressure is then adjusted to an optimum slip by the pressure control valve arrangement, which lowers, holds or builds up said pressure in accordance with the wheel behavior and hence with the friction conditions between the tire(s) and the road.

ABS pressure control valve arrangements without a relay action, to which the exemplary embodiments and/or exemplary methods of the present invention relate, are used on vehicles such as commercial vehicles, buses, semitrailer trucks and trailers. Pressure control valve arrangements without a relay action generally have 3/2-way solenoid valves as pilot control valves for diaphragm valves, wherein an electronic control device activates the 3/2-way solenoid valves to enable the functions required for ABS operation, "pressure holding", "pressure reduction" and "pressure buildup", to be carried out. During a braking operation which does not involve a response by the ABS (no tendency for a wheel to lock), the pressure medium, generally air, flows through the pressure control valve arrangements unhindered in both directions during air admission to and venting from the brake cylinders. This ensures that the operation of the service brake system is not affected by the ABS pressure control valve arrangement.

Within the housing, pressure control valves of the type in question in the form of single-channel pressure control valves for antilock systems of motor vehicles have respective diaphragm valves as a holding valve and an outlet valve and respective solenoid control valves for the holding valve and the outlet valve. The two diaphragm valves each contain a diaphragm, which can be acted upon by the pressure in a control chamber, wherein the control chamber is closed off from the outside by a cover secured on the housing.

A pressure control valve arrangement of the type in question for an ABS brake system is discussed in EP 0 266 555 A1, for example. In the prior-art pressure control valve arrangements, the housing has a pressure medium connection for pressure application and/or pressure relief, which is connected to a foot brake valve. Moreover, the two diaphragm valves are arranged on the side of the housing, wherein the corresponding pilot control spaces are closed off by covers secured on the side of the housing. These covers are produced by primary shaping processes such as injection molding, wherein passages or transverse channels are already allowed for during injection molding but transverse channels open on one side have to be covered by additional plastic closure parts. A cover shown in FIG. 2 of this document, for example, does admittedly have a transverse channel which interconnects a blind hole open toward the control chamber and a blind hole opening into a pressure medium channel in the housing and which is partially produced in the course of the injection molding process. However, owing to the molding process, this transverse channel is open at the outside of the housing and has to be closed off by a separate closure part. However, the production of this closure part and its mounting on the cover is associated with additional costs, accounting in total for a relatively high contribution to costs, given the large number of pressure control valve arrangements supplied by a supplier for vehicles.

If such a transverse channel 300 in the cover 270 is not formed partially in a primary shaping process but is produced by machining, there is the problem that the penetration of a drill from a radially outer boundary surface of the cover 270 then gives rise to an unwanted opening at this boundary surface in the transverse channel 300 extending between the blind holes 290a, 290b, and this opening must be re-closed by a ball 400 inserted into the opening, for example, as is evident from FIG. 6, which represents this prior art. In this method too, therefore, additional costs arise from the production and fitting of the ball 400.

Given this situation, it is the underlying object of the exemplary embodiments and/or exemplary methods of the present invention to provide a pressure control valve arrangement of the type mentioned at the outset in such a way that it is simpler and less expensive to produce and assemble. Moreover, the intention is to indicate a corresponding production method.

According to the exemplary embodiments and/or exemplary methods of the present invention, this object is achieved by the features described herein.

SUMMARY OF THE INVENTION

As already mentioned above, the transverse channel provides a fluidic connection between the blind holes, of which one blind hole communicates with the control chamber and the other blind hole communicates with the pressure medium channel formed in the housing in order to supply the control chamber with pressure medium or release pressure medium from said chamber.

The exemplary embodiments and/or exemplary methods of the present invention provides that the transverse channel have an acute angle relative to the plane of the cover and open at one end, by a transverse channel opening, into the control chamber or into the pressure medium channel, wherein the transverse channel opening at least partially overlaps the blind hole opening of one of the blind holes connected by the transverse channel.

By virtue of this geometry, it is possible for at least the transverse channel to be produced completely and integrally with the cover during the primary shaping process itself.

The cover together with the transverse channel is therefore produced by primary shaping, which may be as an injection molding made of plastic or aluminum, wherein, during the primary shaping of the cover, a mandrel-type core of the primary shaping die is positioned or is present on the primary shaping die in such a way that the transverse channel produced by the core has an acute angle relative to the plane of the cover and opens by a transverse channel opening into the control chamber or into the pressure medium channel. After this or simultaneously as part of the primary shaping process, at least two blind holes are produced at positions in the cover such that they are interconnected by the transverse channel, and the transverse channel opening at least partially overlaps the blind hole opening of one of the blind holes connected by the transverse channel.

The large number of pressure control valve arrangements produced in motor vehicle manufacture and the large number of covers which is also produced as a consequence justify a somewhat more complex injection molding die with a mandrel-type core. On the other hand, there is no longer any need to produce and fit any additional closure parts for unwanted holes or openings of the transverse channel, leading to higher costs in comparison.

The alternative of machining such a transverse channel in the cover, which channel would then extend obliquely, has the disadvantage that the cover would have to be re-clamped in the machining center to enable said channel to be produced in addition to the blind holes made at a right angle to the cover. However, re-clamping the cover to produce just one transverse channel is associated with a lot of effort and is therefore also costly.

Advantageous developments and improvements of the exemplary embodiments and/or exemplary methods of the present invention described herein are possible by the measures presented in the detailed description herein.

Owing to the production process described above, the transverse channel opening into the control chamber or into the pressure medium channel has a substantially oval cross section, whereas the cross section of the transverse channel, when viewed in a plane perpendicular to the center line of the transverse channel, may be cylindrical.

According to a development, the transverse channel opens at the other end into the other blind hole connected by the transverse channel, the entry being at an acute angle relative to the center line of said blind hole, wherein the transverse channel ends at the bottom of the other blind hole and does not extend beyond the other blind hole.

At the same time, at least one cover can be configured in such a way that, in addition to acting as a closure body for the control chamber, it simultaneously closes a hole which is formed in the housing, which is not provided for connection to the control chamber and opens into a side face of the housing. There is then no need for an additional closure for this hole to be produced and fitted.

According to a development of the production method according to the present invention, the blind holes are produced together with the transverse channel in a single operation, during the primary shaping process for the cover, by providing corresponding blind hole cores on the primary shaping die.

As an alternative, it is also possible for the blind holes to be produced by machining, e.g. drilling, only after the primary shaping of the cover.

Further measures that improve the present invention are explained in greater detail below together with the description of an exemplary embodiment of the present invention with reference to the drawings.

DETAILED DESCRIPTION

Figure 1:
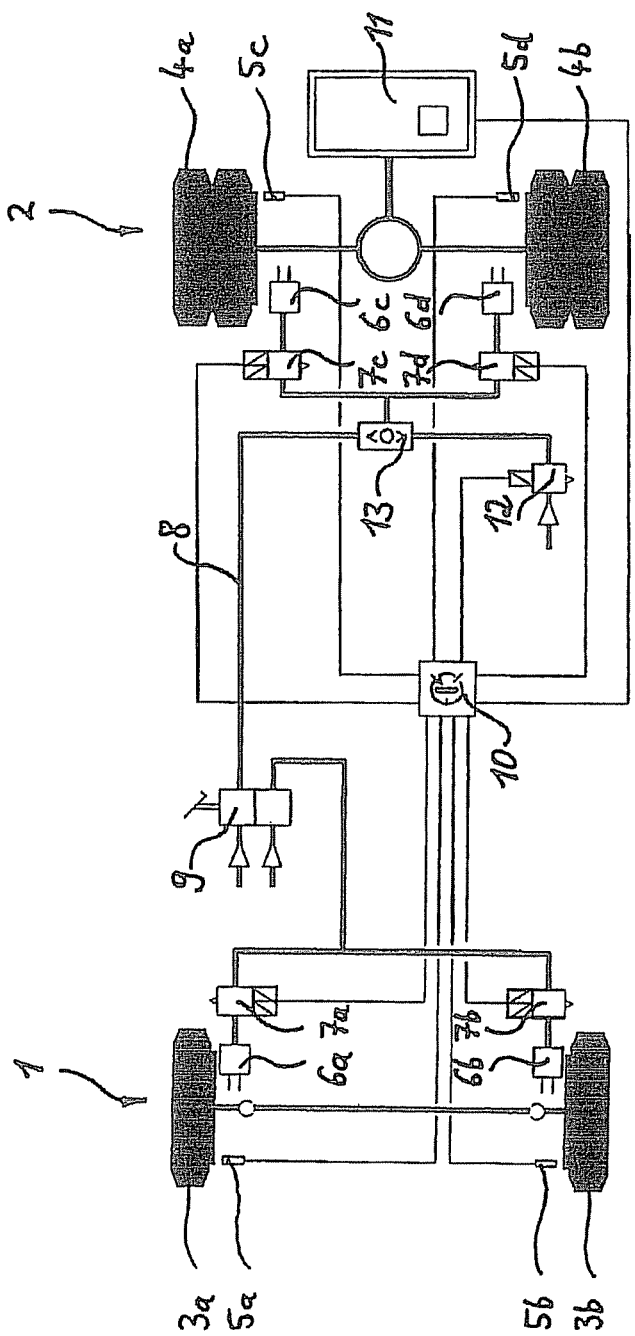
FIG. 1 shows a diagrammatic representation of an ABS brake system as a general layout of a four-sensor/4-channel ABS brake system of a vehicle.

According to FIG. 1, a vehicle fitted with an ABS brake system has a front axle 1 and a rear axle 2. Wheels 3a and 3b are arranged on the front axle 1; the rear axle 2 has wheels 4a and 4b, each fitted with twin tires, for example. In this case, the ABS brake system used to brake these wheels 3a, 3b and 4a, 4b is in the form of a four-sensor/4-channel system. This means that, in this case, a total of four rotational speed sensors 5a-5b and four pressure control valve arrangements 7a-7d are available. The pressure control valve arrangements 7a-7d are used to control respectively associated brake cylinders 6a-6d. All the pressure control valve arrangements 7a-7d are connected to a foot brake valve 9 by a branching pneumatic brake pressure line 8.

In actuating the foot brake valve 9, the driver generates a brake pressure, which, passing through the pressure control valve arrangements 7a-7d via the pneumatic brake pressure line 8, is transmitted to the brake cylinders 6a-6d associated with wheels 3a, 3b and wheels 4a, 4b.

Figure 2A:
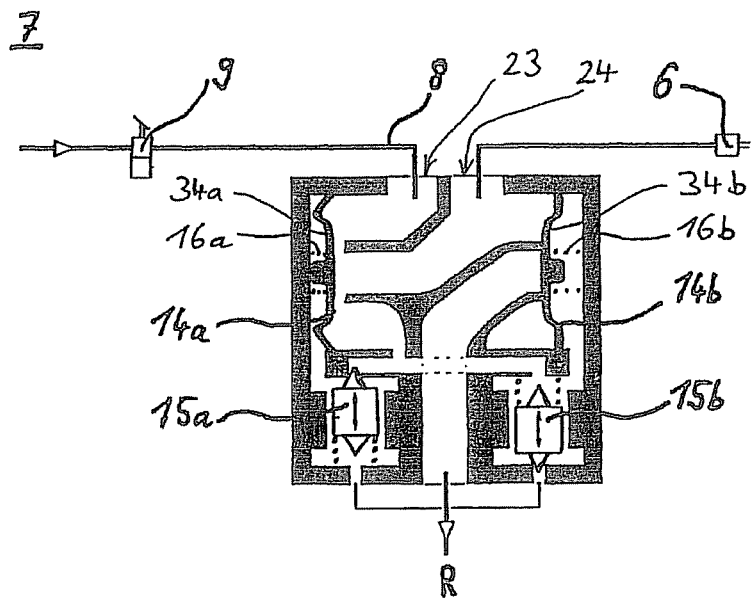
FIG. 2a shows a schematic representation of a pressure control valve arrangement which controls a brake cylinder, in the open state (pressure buildup).
Figure 2B:
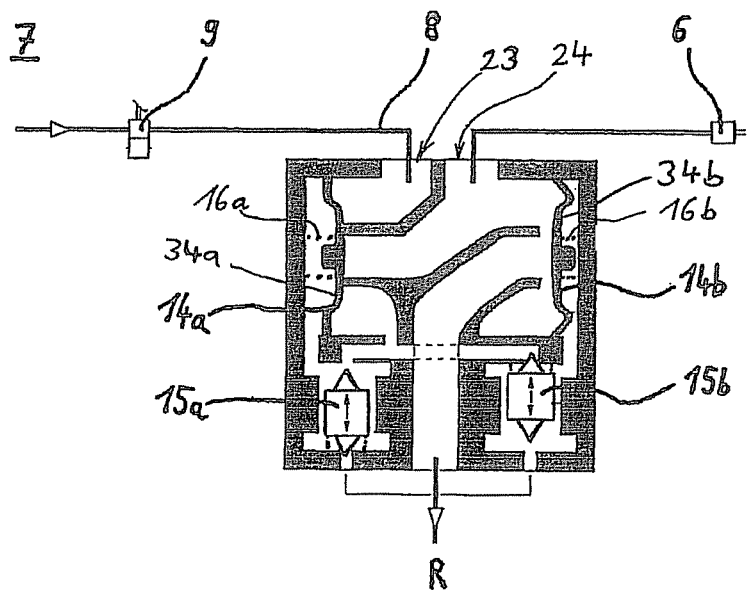
FIG. 2b shows a schematic representation of the pressure control valve arrangement in FIG. 2a in the closed state (pressure reduction).
Figure 4:
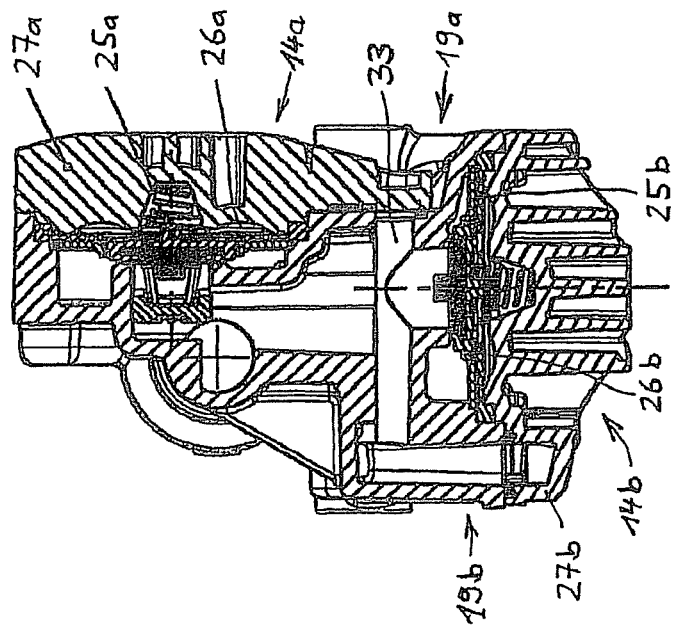
FIG. 4 shows a sectional representation along the line IV-IV in FIG. 3.

The pressure control valve arrangements 7a-7d can be activated by integrated solenoid valves 15a, 15b, shown in FIG. 2a, FIG. 2b and FIG. 4, and, for this purpose, are connected electrically to a central electronic control unit 10. On the input side, the electronic control unit 10 is connected to the four rotational speed sensors 5a-5b that detect the wheel speeds. If a wheel 3a-3d locks, the brake pressure input by the driver via the foot brake valve 9 is reduced by the corresponding pressure control valve arrangement 7a-7d in an ABS control operation under the command of the electronic control unit 10 until locking has been eliminated. The ABS brake system in the embodiment under consideration furthermore comprises an ASR function, which comprises an ASR unit 11 for reducing the engine torque, an ASR solenoid valve 12 and a shuttle valve 13.

Here, the pressure control valve arrangement 7 used for the purpose of ABS control as part of the ABS brake system in accordance with FIG. 2a is constructed in the manner of a single-channel pressure control valve arrangement and essentially comprises two integrated diaphragm valves 14a and 14b and two spring-loaded solenoid valves 15a, 15b, which control said diaphragm valves. The diaphragm valves 14a and 14b are each biased in the closing direction by spring elements 16a, 16b and are pilot-controlled by the respectively associated solenoid valves 15a and 15b.

In FIG. 2a, the pressure control valve arrangement 7 is shown in the open position thereof, in which a pressure buildup to the connected brake cylinder 6 takes place. In this case, neither of the solenoid valves 15a and 15b is electrically activated. In the position shown, the compressed air coming from the foot brake valve 9 pushes open diaphragm valve 14a, which is configured as an inlet valve. The normally closed solenoid valve 15a prevents the associated diaphragm valve 14a from being closed again. Via the normally open second solenoid valve 15b, the brake pressure coming from the foot brake valve 9 closes the second diaphragm valve 14b, which serves as an outlet valve. The compressed air thus passes unhindered through the pressure control valve arrangement 7. The pressure control valve arrangement 7 is in this state also when there is no ABS control taking place.

To hold the brake pressure constant in a brake cylinder 6a to 6d, all that is required is to energize solenoid valve 15a, as a result of which said valve opens and, as a consequence, the brake pressure coming from the foot brake valve 9 pushes shut the inlet-side diaphragm valve 14a. The pressure on the right hand side and the left hand side of diaphragm valve 14a is now equal. However, since the effective area on the left hand side of diaphragm valve 14a is larger, diaphragm valve 14a is closed. The same applies to the outlet-side diaphragm valve 14b controlled by solenoid valve 15b. To hold the pressure constant, the pressure control valve arrangement 7 thus closes the pneumatic brake pressure line 8 running from the foot brake valve 9 to the brake cylinder 6.

According to FIG. 2b, a pressure reduction in a brake cylinder 6a to 6d is achieved by energizing both solenoid valves 15a and 15b. The statements made above on maintaining the pressure apply to solenoid valve 15a and the associated inlet-side diaphragm valve 15a. The other solenoid valve 15b, on the other hand, is closed due to energization. The pressure coming from the brake cylinder 6 therefore pushes the outlet-side diaphragm valve 14b open, and the brake cylinder 6 is vented.

The above-described functions of the pressure control valve arrangement 7 are carried out in the manner described at the outset as part of an ABS/ASR control operation under the command of the electronic control unit 10.

Figure 3:
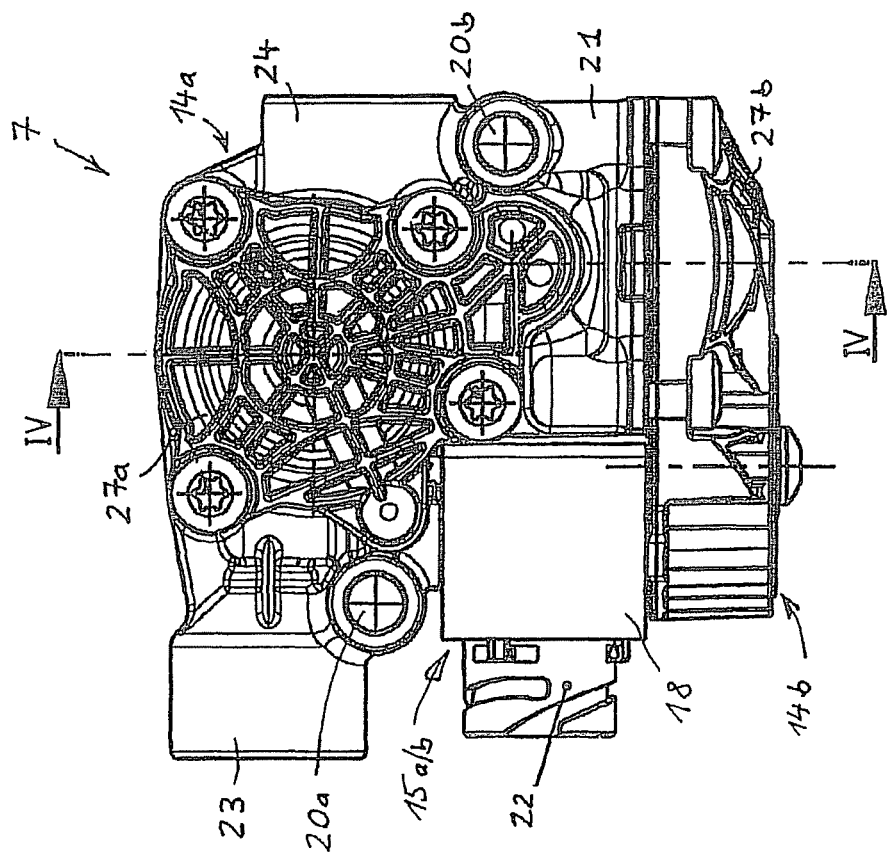
FIG. 3 shows a side view of a specific embodiment of the pressure control valve arrangement in FIG. 2a and FIG. 2b in accordance with an exemplary embodiment of the present invention.
Figure 6:
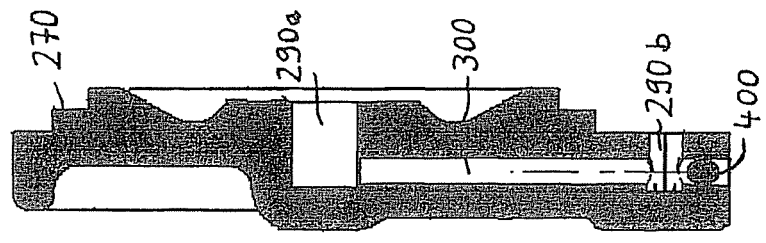
FIG. 6 shows a sectional representation of a cover of a pressure control valve arrangement according to the prior art.
Figure 5:
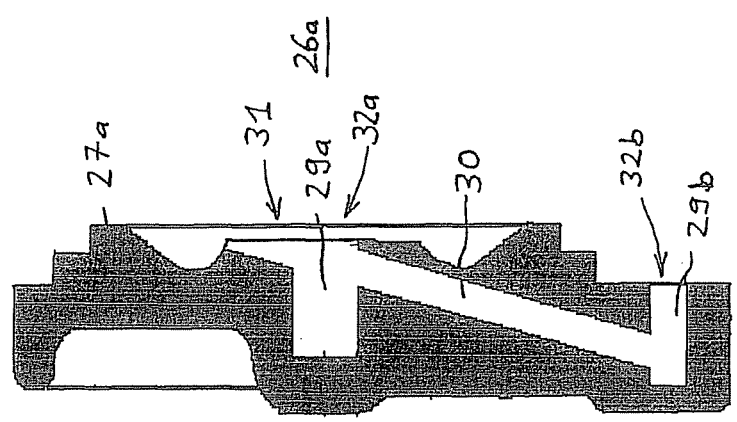
FIG. 5 shows a sectional representation of a cover of the pressure control valve arrangement in FIG. 3.

In FIG. 3 to FIG. 5, the pressure control valve arrangement 7 illustrated only schematically in FIG. 2a and FIG. 2b is shown in a specific embodiment in the installed position, i.e. the components described above are at the top. In this embodiment, the two solenoid valves 15a, 15b for pilot control of the diaphragm valves 14a, 14b are combined in a dual solenoid valve, although it operates in a manner similar to individual valves 15a, 15b.

The two solenoid valves 15a, 15b have a double magnet 18 housed in a block 17, having two magnet coils, which interact with two solenoid valve seats. Magnet armatures, which interact with the solenoid valve seats of the solenoid valves 15a, 15b and are not shown explicitly here, are operated as valve closing members by energizing the magnet coils.

The block 17 surrounding the double magnet 18 is secured on a housing 21 of the pressure control valve arrangement 7, which may be on the front side, and has a plug connection for supplying power to the double magnet 18. This housing 21 furthermore has a pressure medium connection 23 for supplying pressure to and/or relieving pressure from the pressure control valve arrangement 7, and a working connection 24 for connection of the brake cylinder 6 (FIG. 3).

As FIG. 2a and FIG. 2b show, the pressure medium connection 23 is connected to the foot or service brake valve 9 of the fluid-pressure-actuated braking device by the brake pressure line 8 and is supplied with air or vented in accordance with an actuation of the foot brake valve 9.

As is apparent especially from FIG. 3, the housing 21 is provided with at least one and, in this case, for example, two through holes 20a, 20b opening into both side faces 19a, 19b of the housing 21, through which holes holding arrangements, e.g. screws, for holding the pressure control valve arrangement on a support, e.g. on a chassis of the vehicle, project. The center lines of the two through holes 20a, 20b may be parallel to each other. The axial length of the through holes 20a, 20b applies as a standardized installation dimension of the pressure control valve arrangement 7 and, for reasons of space, is fixed and invariable, defining the maximum permissible width B of the housing 21.

One diaphragm valve 14a may be arranged on the side of the housing 21, and the other diaphragm valve 14b may be arranged on the bottom of the housing 21, as FIG. 4 shows. As a valve body, a diaphragm valve 14a, 14b of this kind has a diaphragm 25a, 25b, which can be acted upon by introducing pressure medium into a control chamber 26a, 26b, each of which is covered on the outside of the housing by a cover 27a, 27b produced by a primary shaping process, such as injection molding, which is secured on the housing 21. In this arrangement, the control chamber 26a, 26b is formed between the diaphragm 25a, 25b and the cover 27a, 27b. Blind holes 29a, 29b (FIG. 5), which extend substantially perpendicularly to the plane of the cover 25a, 25b, are formed in the cover 27a, 27b, the blind hole opening 32a, 32b of said blind holes opening, in the direction of the control chamber 26a, 26b, into the control chamber 26a, 26b or into at least one pressure medium channel in the housing 21, at least two of said blind holes 29a, 29b being fluidically interconnected by at least one transverse channel 30. Such blind holes 29a, 29b, in this case which may be two such holes, and the transverse channel 30 are illustrated schematically in the isolated illustration of a cover 27a in FIG. 5. As an alternative, it is also possible for more than two blind holes 29a, 29b to be interconnected by such a transverse channel.

It is for this reason that FIG. 5 shows a separate view of a cover 27a in which a transverse channel 30 extends between two blind holes 29a, 29b.

The transverse channel 30 creates a fluidic connection between the blind holes 29a, 29b, of which one blind hole 29a communicates with the control chamber 26a and the other blind hole 29b communicates, for example, with the opening of a pressure medium channel which is formed in the housing 21 and is not shown explicitly here in order to supply the control chamber 26a with pressure medium or release pressure medium therefrom.

As illustrated there, the transverse channel 30 has an acute angle relative to the plane of the cover 27a, i.e. the plane of the plate of the plate-shaped cover 27a, and may open, by a transverse channel opening 31, into the control chamber 26a. The transverse channel opening 31 of the transverse channel 30 in the control chamber 26a overlaps the blind hole opening 32a of that blind hole 29a of the blind holes 29a, 29b connected by the transverse channel 30 which is closest to a center or a center line of the cover 27a. Relative to the plane of the cover 27a, the transverse channel 30 thus may extend from the radial inside to the radial outside and away from the housing 21 when viewed in the axial direction.

The cover 27a with the transverse channel 30 is produced integrally by primary shaping, which may be as an injection molding made of plastic or aluminum. During the primary shaping of the cover 27a, a mandrel-type core of the primary shaping die is positioned or is present on the primary shaping die in such a way that the transverse channel 30 produced by the core has an acute angle relative to the plane of the cover 27a and may open, by the transverse channel opening 31, into the control chamber 26a. After this or simultaneously as part of the primary shaping process, the two blind holes 29a, 29b are produced at positions in the cover 27a such that they are interconnected by the transverse channel 30, and the transverse channel opening 31 at least partially overlaps the blind hole opening 32a of the centrally arranged blind hole 29a.

In this case, the transverse channel 30 opens into the other blind hole 29b connected by the transverse channel 30, wherein the transverse channel 30 may end at the bottom of the other blind hole 29b and does not extend beyond the other blind hole 29b and in particular, does not penetrate the wall of the cover 27a again.

In this case, the blind holes 29a, 29b may be produced together with the transverse channel 30 in a single operation, during the primary shaping process for the cover 27a, by providing corresponding blind hole cores on the primary shaping die. As an alternative, however, it is also possible for the blind holes 29a, 29b to be produced only after the primary shaping of the cover 27a, by machining, e.g. drilling.

Owing to the production process described above, the transverse channel opening 31 into the control chamber 26a has a substantially oval cross section, while the cross section of the transverse channel 30 may be cylindrical, when viewed in a plane perpendicular to the center line of the transverse channel 30.

At the same time, the cover 27a can be configured in such a way that, in addition to acting as a closure body for the control chamber 26a, it simultaneously closes a hole 33 which is formed in the housing 21, which is not provided for connection to the control chamber 26a and opens into a side face 19a, 19b of the housing 21, for example (FIG. 4).

LIST OF REFERENCE SIGNS 1 front axle
2 rear axle
3 wheel
4 wheel
5 rotational speed sensor
6 brake cylinder
7 pressure control valve arrangement
8 brake pressure line
9 foot brake valve
10 control unit
11 ASR unit
12 ASR solenoid valve
13 shuttle valve
14 a/b diaphragm valve
15 a/b solenoid valve
16 a/b spring element
17 block
18 double magnet
19 a/b side face
20 a/b through hole
21 housing
22 plug connection
23 pressure medium connection
24 working connection
25 a/b diaphragm
26 a/b control chamber
27 a/b cover
29 a/b blind holes
30 transverse channel
31 transverse channel opening
32 a/b blind hole opening
33 hole
270 cover
290 a/b blind holes
300 transverse channel
400 ball

The invention claimed is:

1. A pressure control valve arrangement for controlling a fluid pressure in an ABS brake system of a vehicle so that, while there is a tendency of individual wheels of the vehicle to lock, the brake pressure in at least one associated brake cylinder can be adaptively adjusted, comprising:
a housing; and
at least one diaphragm valve accommodated in the housing, the diaphragm valve having a diaphragm as the valve body, which diaphragm can be acted upon by introducing a pressure medium into a control chamber that is covered on the outside of the housing by a respective cover produced by primary shaping, so that the control chamber is formed between the diaphragm and the cover, wherein blind holes, which extend in the cover substantially perpendicularly to the plane of the cover, are formed in the cover, the blind hole opening of at least one of the blind holes leading into the control chamber, and the blind hole opening of at least one other of the blind holes leading into a pressure medium channel formed in the housing, and the at least one blind hole and the other of the blind holes being fluidically interconnected by at least one transverse channel, wherein the transverse channel has an acute angle relative to the plane of the cover and opens at one end, by a transverse channel opening, into the control chamber or into the pressure medium channel, wherein the transverse channel opening at least partially overlaps the blind hole opening of the other of the blind holes, which is centrally arranged, connected by the transverse channel;
wherein the transverse channel opening has a substantially oval cross-section,
wherein the cross-section of the transverse channel is cylindrical in a plane perpendicular to the center line of the transverse channel, and
wherein the transverse channel opens into the other of the blind holes connected by the transverse channel, wherein the transverse channel ends at the bottom of the other blind hole and does not extend beyond the other blind hole and does not penetrate the wall of the cover again.

2. The pressure control valve arrangement of claim 1, wherein the cover is an injection molding made of plastic or aluminum.

3. The pressure control valve arrangement of claim 1, wherein the transverse channel opens at the other end into the other blind hole connected by the transverse channel, the entry being at an acute angle relative to the center line of the blind hole.

4. The pressure control valve arrangement of claim 3, wherein the transverse channel ends at the bottom of the other blind hole.

5. The pressure control valve arrangement of claim 1, wherein the cover, together with the blind holes and the transverse channel, is formed integrally.

6. The pressure control valve arrangement of claim 1, wherein solenoid control valves, which can be controlled by an electronic control device, are provided for pilot control of the at least one diaphragm valve.

7. The pressure control valve arrangement of claim 1, wherein at least one cover is configured in such a way that, in addition to acting as a closure body for the control chamber, it simultaneously closes a hole which is formed in the housing, which is not provided for connection to the control chamber and opens into a side face of the housing.

8. A brake-slip-controlled and fluid-pressure-actuated braking device for a vehicle, comprising:
- at least one pressure control valve arrangement for controlling a fluid pressure in an ABS brake system of a vehicle so that, while there is a tendency of individual wheels of the vehicle to lock, the brake pressure in at least one associated brake cylinder can be adaptively adjusted, including:
- a housing; and
- at least one diaphragm valve accommodated in the housing, the diaphragm valve having a diaphragm as the valve body, which diaphragm can be acted upon by introducing a pressure medium into a control chamber that is covered on the outside of the housing by a respective cover produced by primary shaping, so that the control chamber is formed between the diaphragm and the cover, wherein blind holes, which extend in the cover substantially perpendicularly to the plane of the cover, are formed in the cover, the blind hole opening of at least one of the blind holes leading into the control chamber, and the blind hole opening of at least one other of the blind holes leading into a pressure medium channel formed in the housing, and the at least one blind hole and the other of the blind holes being fluidically interconnected by at least one transverse channel, wherein the transverse channel has an acute angle relative to the plane of the cover and opens at one end, by a transverse channel opening, into the control chamber or into the pressure medium channel, wherein the transverse channel opening at least partially overlaps the blind hole opening of the other of the blind holes, which is centrally arranged, connected by the transverse channel;
- wherein the transverse channel opening has a substantially oval cross-section,
- wherein the cross-section of the transverse channel is cylindrical in a plane perpendicular to the center line of the transverse channel, and
- wherein the transverse channel opens into the other of the blind holes connected by the transverse channel, wherein the transverse channel ends at the bottom of the other blind hole and does not extend beyond the other blind hole and does not penetrate the wall of the cover again.

9. The braking device of claim 8, wherein the cover is an injection molding made of plastic or aluminum.

10. The braking device of claim 8, wherein the transverse channel opens at the other end into the other blind hole connected by the transverse channel, the entry being at an acute angle relative to the center line of the blind hole.

11. The braking device of claim 10, wherein the transverse channel ends at the bottom of the other blind hole.

12. The braking device of claim 8, wherein the cover, together with the blind holes and the transverse channel, is formed integrally.

13. The braking device of claim 8, wherein solenoid control valves, which can be controlled by an electronic control device, are provided for pilot control of the diaphragm valves.

14. The braking device of claim 8, wherein at least one cover is configured in such a way that, in addition to acting as a closure body for the control chamber, it simultaneously closes a hole which is formed in the housing, which is not provided for connection to the control chamber and opens into a side face of the housing.

\* \* \* \* \*